Jan. 30, 1945.  F. M. YOUNG  2,368,391
METHOD OF FASTENING TUBES IN HEADERS OR TUBE PLATES
Filed May 23, 1942
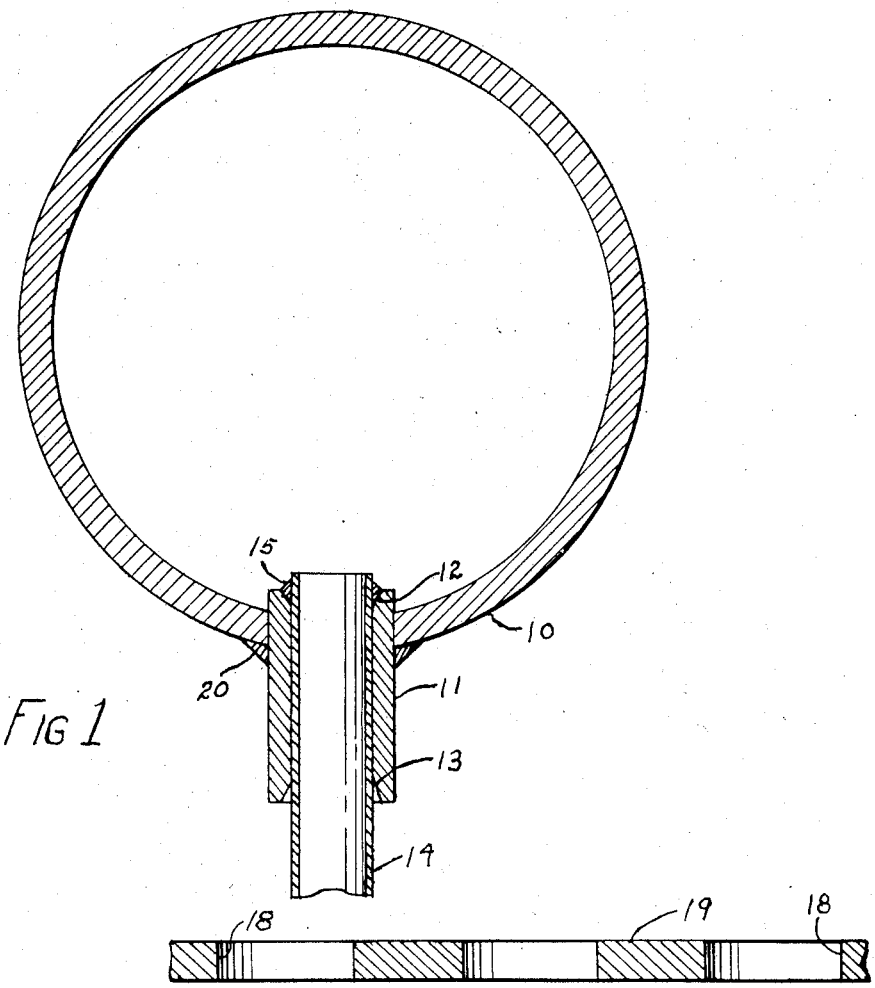
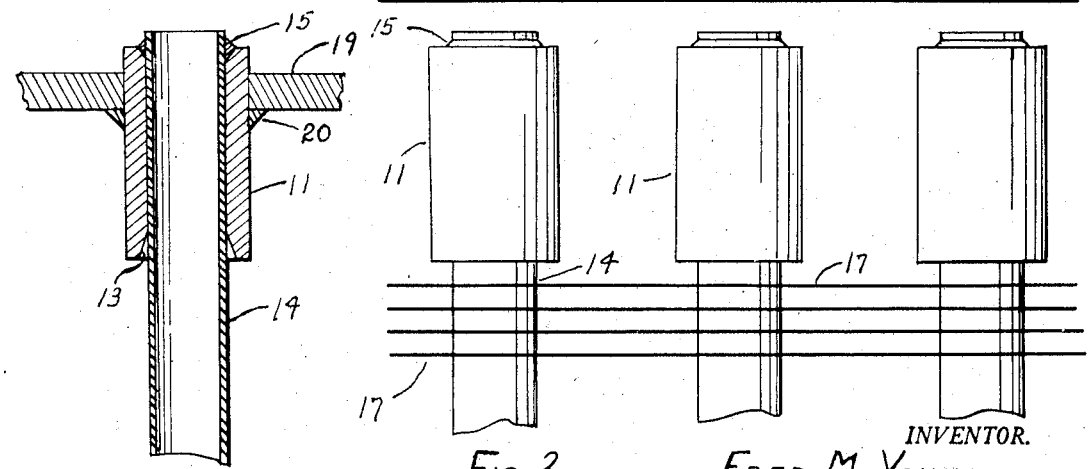
Fig 1
Fig 2
Fig 3
INVENTOR.
FRED M. YOUNG
BY
ATTORNEY Patented Jan. 30, 1945

2,368,391

UNITED STATES PATENT OFFICE 2,368,391

METHOD OF FASTENING TUBES IN HEADERS OR TUBE PLATES

Fred M. Young, Racine, Wis.

Application May 23, 1942, Serial No. 444,198

2 Claims. (Cl. 285—111)

The sensitive nature of copper as to overheating has made it difficult to secure thin walled copper tubes to heat exchanger headers and tube plates. One cause of this difficulty is the fact that the tube plates or walls of the headers are very much thicker than the thickness of the walls of the tubes and the fact that some modern heat exchangers have steel tube plates or headers which require a bonding either by brazing or electric welding either of which require high temperature. The difficulty of brazing a very thin walled tube to a relatively thick tube plate or header wall is increased because the tube wall is very thin and may be burned before the heavier member reaches the fusion bonding temperature.

Copper is considered a precious metal and therefore the walls of the tubes must be very thin. In many cases these walls are not over .025 inch thick whereas the tube plate may be one eighth inch thick or even more.

One of the difficulties in copper tube heat exchangers is that the tubes are easily fractured. This difficulty is multiplied many times by the fact that there is usually considerable vibration either set up by the action of the fan motor, the air current, or vibrations from the base upon which the exchanger is supported.

If a tube is overheated when it is brazed to the tube plate or header the injury always occurs at the most critical point on the tube.

Another difficulty encountered is the human element. The tools in the hands of a skilled operator, as a rule, may prevent excessive overheating; however when there are from 50 to 100 tubes or more in a core to be bonded to the other element, one injured tube in the lot will seriously effect the value of the exchanger when completed because when a single tube of the lot is fractured, the entire exchanger may be ruined.

An object of the present invention is to provide a design in which overheating of a single tube in an assembly is eliminated even if the operation is in the hands of a workman inclined to be a bit careless at times.

In my design, means are provided whereby if the completed exchanger passes the leak-proof test there will be no danger of subsequent fracture because the tubes are protected against vibration at the point where they are secured to the header.

I accomplish the objects of this invention by supplying relatively thick walled sleeves of a suitable length which are brazed to the ends of the tubes, after which the sleeves are inserted into the openings in the header or tube plate and then the outside surfaces of the sleeves are preferably electric welded to the header or tube plate.

The invention is applicable to structures where the headers or tube plates and sleeves are steel and the weld between the header or tube plate is a considerable distance from the brazing at the tube ends; thus making it possible to braze the tube to the end of steel sleeves and electric weld the sleeves to the tube plate or header without danger of injuring the tubes or the brazing.

To these and other useful ends, my invention consists of parts, combinations of parts, or their equivalents, and mode of operation, as hereinafter set forth and claimed and shown in the accompanying drawing in which:

Fig. 1 is a transverse sectional view of a circular pipe header taken through a sleeve and a fraction of the tube.

Fig. 2 is a sectional view through a fraction of a tube plate wherein the tube is secured to a flat tube plate.

Fig. 3 illustrates a fraction of a core and a tube plate of a heat exchanger ready to be assembled.

As thus illustrated in Figure 1, numeral 10 designates a header which is generally made from steel and having considerable thickness as illustrated, so it is suitable for high pressure steam. Numeral 11 designates a steel sleeve having preferably a wall thickness about equal to the thickness of the header tube wall and having a length preferably about as illustrated. Sleeve 11 is counter-bored at its inner end as at 12 and flared at the other end as at 13. The tube is designated by reference numeral 14 which, as will be noted, has a comparatively thin wall and is generally made from copper or a copper alloy.

Tubes 14 preferably protrude a short distance through the ends of sleeves 11 as illustrated; thus an annular trench is provided by counterbore 12 forming a suitable receptacle for the brazing material 15 without danger of getting the spelter in the tube or on the outside of the sleeve and providing means whereby the brazing can be done without danger of overheating the tube.

In building a heat exchanger of the class, the core comprises a number of tubes 14 having a multiplicity of spaced fins 17 through which the tubes extend. After the tubes and fins are assembled into a core, as fractionally illustrated in Figure 3, sleeves 11 are positioned on the ends of the tubes as illustrated and brazed thereto as at 15. Openings 18 are provided in tube plate 19 or circular header 10 adapted to register with the tubes and sleeves of the core and after the operation of securing the sleeves to the ends of the tubes, as illustrated in Figure 3, the tube ends and sleeves are inserted into the openings as illustrated in Figures 1 or 2, after which the sleeves are electric welded or brazed to the tube plates or tube header as at 20.

It will be seen that I have provided a strong and efficient heat exchanger which will be practically proof against defects and may be manufactured in a manner which insures against defects even when the assembler is not highly trained.

By referring to Figures 1 and 2, it will be seen that brazings 15 and welds 20 are a considerable distance apart and that they are remote from the point where the tube enters the sleeve, that this latter point provides a gradually increased opening through which the tube extends so as to avoid the possibility of fractures from vibration of the portion of the tube which has been slightly weakened during the first brazing operation.

It will also be seen that the high temperature required for electric welding the sleeves to the tube plates or headers cannot possibly injure the brazed joint or the tube even if the electric weld is necessary on the tube end side of plate 19.

Clearly one of the reasons why my design and method are successful is the fact that steel is comparatively not a good heat conductor so when weld 20 is made, there is no danger of injuring the brazed joint 15 or the tube and when brazing as at 15, close contact with sleeve 11 will prevent overheating tube 14.

Having thus shown and described my invention, I claim:

1. A device of the class described, comprising a tube having mounted on its end a relatively long and thick walled sleeve, their ends being adjacent and brazed or hard soldered together, a relatively thick tube plate having an opening adapted to snugly receive said sleeve after said bonding operation, said sleeve and plate being then welded or brazed together on the opposite side of said tube plate from said brazed ends, the sleeve on the end adjacent said tube end being countersunk for the reception of the brazing material and the opening in the other end of said sleeve being flared.

2. A device of the class described, comprising a number of spaced tubes and a multiplicity of closely spaced fins through which the tubes extend forming a core, sleeves having relatively thick walls and being relatively long and positioned on said tubes, the tube and sleeve ends being adjacent and bonded together, a header inclosure having apertures adapted for the snug reception of said sleeves en masse, said sleeves and header being then secured together by brazing or welding at a point remote from said first bond, the tube end of said sleeve being counterbored for the reception of the brazing material, the opening in the other end of the sleeve being flared.

FRED M. YOUNG.